Patented Dec. 23, 1952

2,623,001

UNITED STATES PATENT OFFICE 2,623,001

PREPARING HEPARIN

Bengt E. G. V. Sylvén, Stockholm, and Karl Olof Snellman, Uppsala, Sweden

No Drawing. Application September 28, 1949, Serial No. 118,468. In Sweden April 7, 1949

2 Claims. (Cl. 167—74)

The invention relates to improvements in a method of preparing heparin from animal tissues and has for its object the provision of a method of preparing heparin in a simple manner and in very pure form.

Earlier methods for the preparation of heparin from animal tissues, organs or parts of organs are all based on an extraction method first elaborated by Charles and Scott (J. Biol. Chem. 102, 425 (1933)). Various modifications have since been made. The procedures are based on tissue extraction with a strongly alkaline solution (0.5–1 N NaOH or KOH) and subsequent treatment with acid at approximately pH 2. The form of heparin obtained is then of low solubility. It is strongly bound to proteins or protein residues in such a way that it can only be freed by digestion with trypsin. Very complicated and lengthy processes of purification are required to remove the final protein residues (v. inter alia Homan & Lens, Biochim. et Biophys. Acta 2, 333–337 (1948)).

Thus, rough chemical methods were formerly used to split the tissue components and extract heparin. The preparation obtained was then assumed to correspond exactly to the native heparin present in living tissue (Jorpes).

By means of careful experiments we have now succeeded in demonstrating that this is not the case. Native heparin does not occur in a pure form as an isolated polysaccharide with a molecular weight of approximately 16,000 as in the pure heparin. Instead, the native molecule forms a complex with a protein body and this complex compound has a molecular weight of 90,000–100,000. This heparin-protein complex is soluble in water and is evidently easily dissociable.

Our experiments have shown that heparin can be bound to protein in two ways, different in principle: (1) with a weakly acid, neutral or weakly alkaline pH, a compound is formed that is soluble in water and readily dissocable; (2) with a lower pH, compounds are formed that are not readily water-soluble, are not dissociable and that cannot be split except with rough procedures. If the pH is then shifted towards the alkaline side, the latter compounds will not dissociate. It is presumably just such compounds of the latter type that have appeared in the known methods of extraction.

The earlier best-known compound of heparin and protein is therefore that in which the heparin is strongly bound to the protein component. It is true that the existence of a readily soluble compound has been cursorily mentioned earlier (Chargaff, Ziff and Moore, J. Biol. Chem. 139, 383 (1941)). Nevertheless, no regard has been paid to it, its properties and stability have not been studied in detail and it has been suggested as specific of the linkage of heparin with an albumin component in the blood. We have thus had no knowledge of the chemical binding of the native heparin to intracellular protein constituents.

The discovery of the native heparin complex has necessitated a revision of earlier conceptions. Moreover, it has opened up possibilities of a production of heparin according to new principles with the object of obtaining the native product. At the same time, the preparation can be considerably simplified and the costs lowered.

Thus, according to the invention animal tissues, organs or parts of organs containing heparin are extracted with an aqueous buffer solution having a pH between 6.5 and 10.0. The pH should be checked throughout extraction to ensure that it does not fall below 6.5. In addition, the conditions must be such that the protein component is not denatured. With this procedure the yield is a readily soluble native complex of heparin and protein as a solute. The extraction buffer solution should preferably be kept at a pH between 7.0 and 7.6. A pH of 7.4 has been found to be particularly suitable.

It is then possible to obtain, in an extremely simple way, a protein-free heparin from the extract prepared as described above. This is done by precipitating the protein part of the native molecule by the addition of a concentrated salt solution (for example, ammonium sulphate or sodium phosphate). The pure heparin then remains in solution.

We have earlier been aware that heparin does not precipitate in the majority of saturated salt solutions. It has also long been known that proteins can be precipitated by means of concentrated salt solutions. It must nevertheless be regarded as an innovation that heparin and protein can be separated in this simple way and so effectively that a pure heparin is obtained.

When the protein has been precipitated and separated, the salt is removed from the heparin solution by dialysis. If so desired, the heparin can be obtained in solid form by precipitation with a water-soluble organic solvent such as acetone, dioxane or alcohol.

The procedure to be followed in the new method is illustrated by the two following examples. The main object of these experiments was to produce a native heparin with as mild a method of extraction as possible.

*Example 1*

25 g. of frozen ox liver capsules were ground and extracted with 116 ml. of an isotonic phosphate buffer at pH 7.4. Tissue remnants were removed by differential centrifugation. A mixture of solid $KH_2PO_4$ and $K_2HPO_4$ balanced to maintain the pH at 7.4 was added to the supernatant extract until the solution became saturated. The precipitate was filtered off. The phosphate salts were then removed by dialysis and the pure heparin precipitated by the addition of alcohol. After filtering off, the heparin was redissolved and fractionated with alcohol. The yield was 100 mg. of heparin per kg. of liver capsule.

*Example 2*

16 g. of frozen ox liver capsules were ground and extracted for 48 hours in an aqueous solution of KCNS (1 mol.) buffered to pH 7.4. Tissue residues were separated off and the supernatant subjected to dialysis. The pH of the solution was controlled throughout this procedure. If pH showed a tendency to fall, alkali was added. The dialysis was interrupted after 72 hours. The protein was precipitated by adding the mixture of phosphates as in Example 1, the precipitation was filtered off and the remaining solution was dialysed. The heparin was then precipitated with alcohol, redissolved and once more precipitated with alcohol. This was followed by fractionation with alcohol. The yield was 180 mg. of heparin per kg of liver capsule.

We claim:

1. A method of preparing heparin, comprising the steps of extracting animal tissues containing heparin by means of an aqueous buffer solution having a pH between 6.5 and 10.0, to obtain a water-soluble heparin-protein complex in the solution and then, in maintaining the indicated pH range, adding to the extract solution thus obtained a soluble salt to precipitate the protein from the complex while keeping the heparin in solution.

2. A method according to claim 1, in which the buffer solution has a pH between 7.0 and 7.6.

BENGT E. G. V. SYLVÉN.
KARL OLOF SNELLMAN.

REFERENCES CITED

The following references are of record in the file of this patent:

FOREIGN PATENTS

| Number | Country | Date |
| --- | --- | --- |
| 9,966 | Great Britain | of 1898 |

OTHER REFERENCES

Charles on Heparin in J. Biol. Chem., vol. 102 (1933), pages 425–427.

Snellman on Extraction of Heparin in Nature 161, April 24, 1948, page 639.